Figure 1:
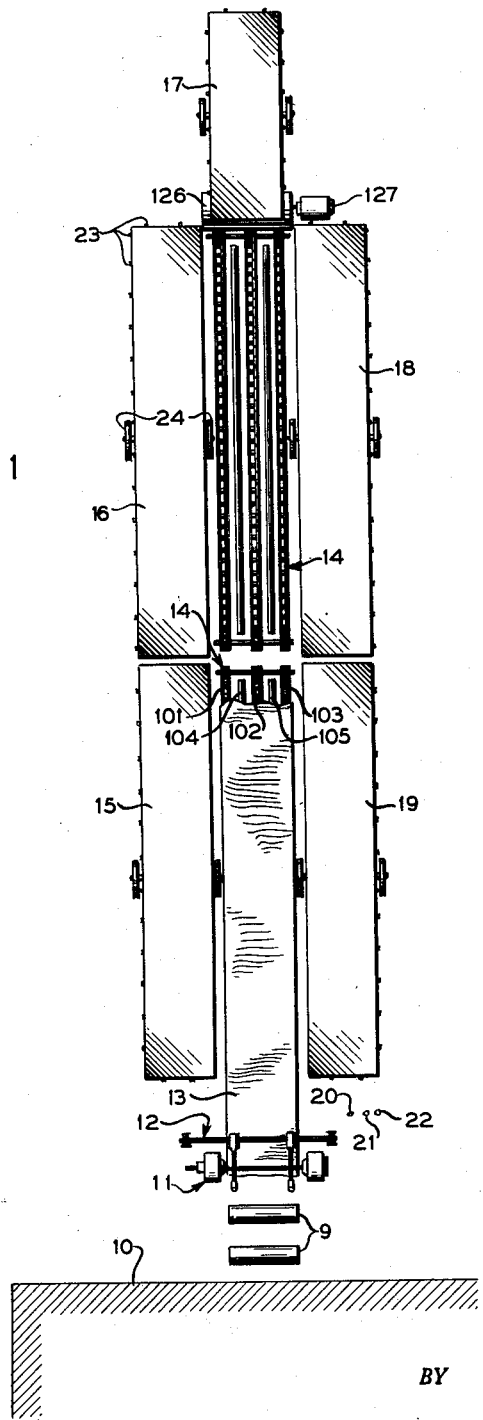

March 2, 1954 D. E. HERVEY 2,670,772
VENEER CUTTING LATHE AND LOG CENTERING MEANS
Filed Aug. 21, 1946 5 Sheets-Sheet 1

INVENTOR.
D. E. HERVEY
BY
A. Yates Dowell
ATTORNEY

March 2, 1954 — D. E. HERVEY — 2,670,772
VENEER CUTTING LATHE AND LOG CENTERING MEANS
Filed Aug. 21, 1946 — 5 Sheets-Sheet 2
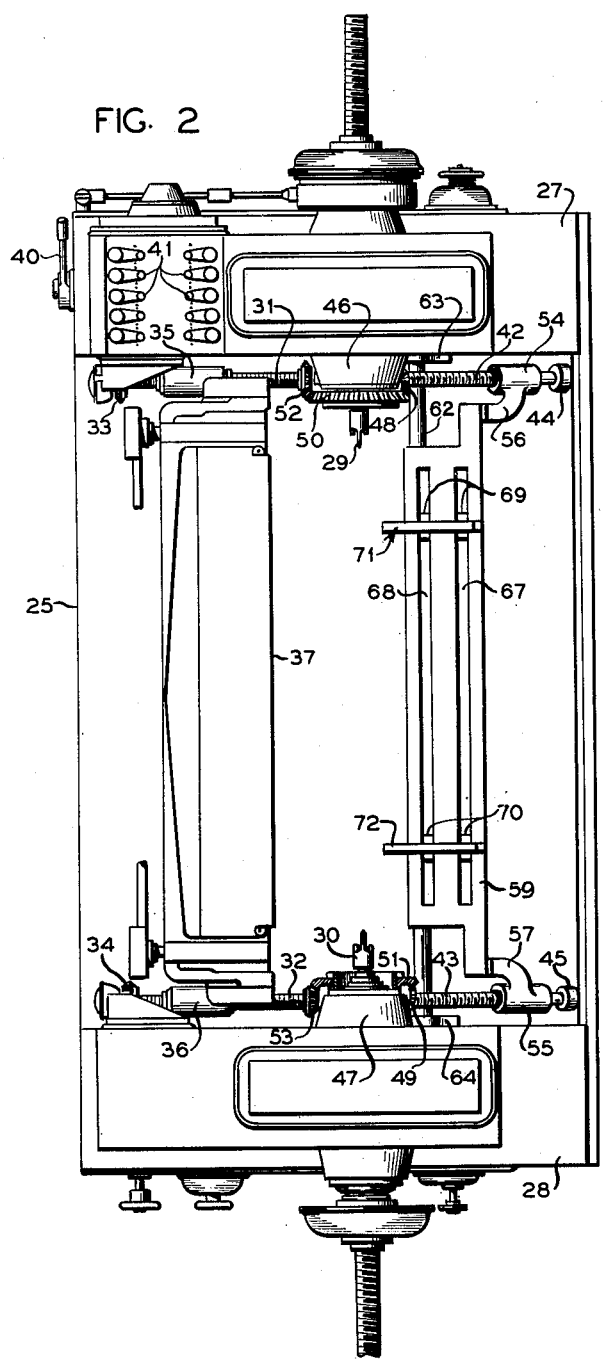
INVENTOR.
D. E. HERVEY
BY
A. Yates Dowell
ATTORNEY March 2, 1954 D. E. HERVEY 2,670,772
VENEER CUTTING LATHE AND LOG CENTERING MEANS
Filed Aug. 21, 1946 5 Sheets-Sheet 3
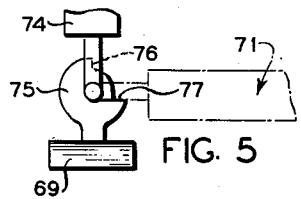
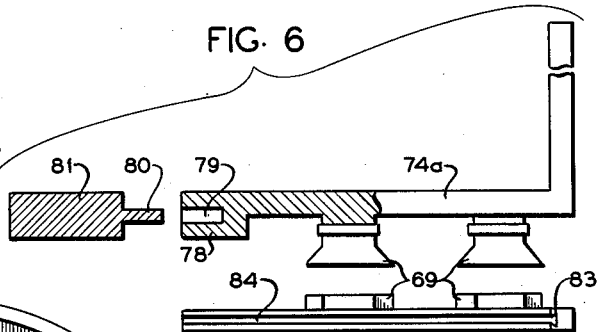
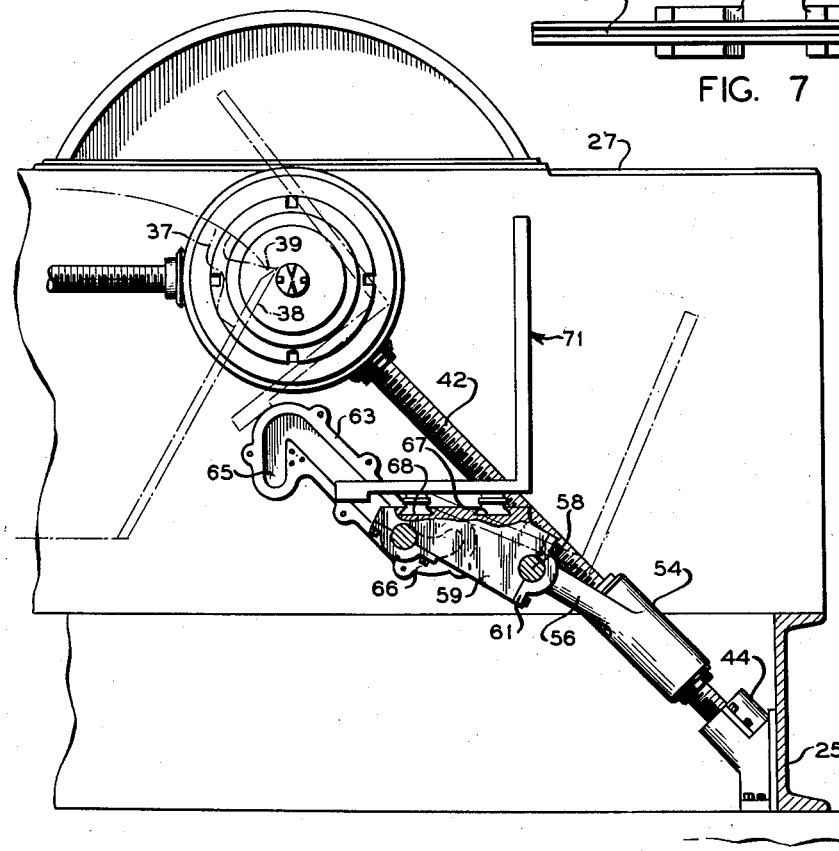
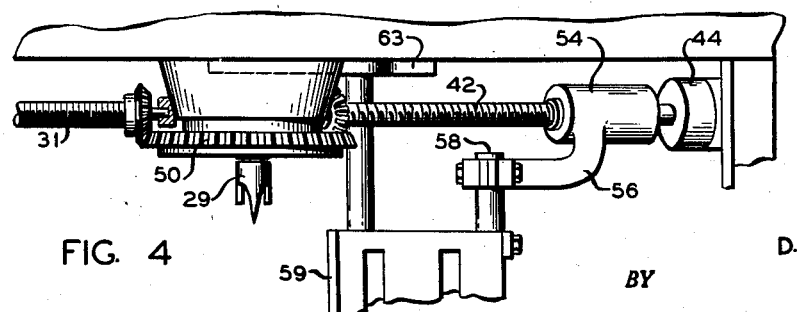
INVENTOR.
D. E. HERVEY
BY
ATTORNEY March 2, 1954  D. E. HERVEY  2,670,772
VENEER CUTTING LATHE AND LOG CENTERING MEANS
Filed Aug. 21, 1946  5 Sheets-Sheet 4
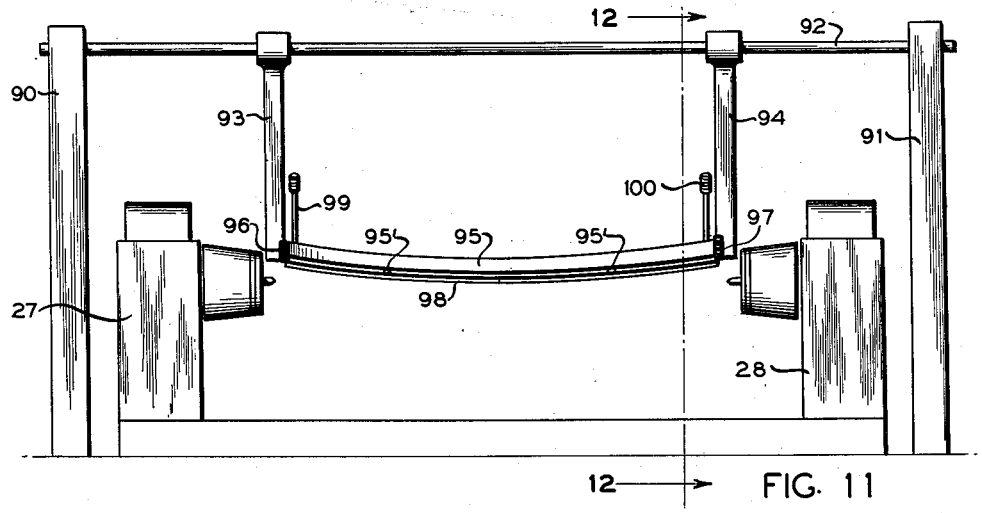
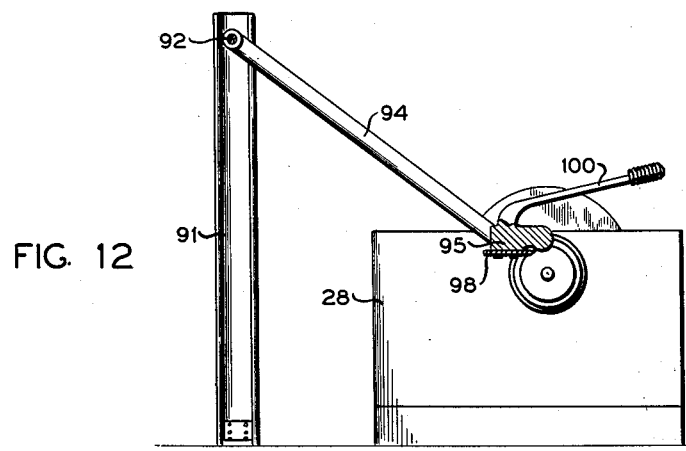
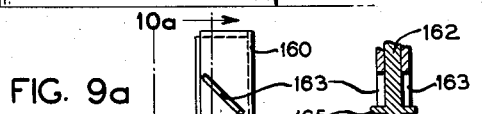
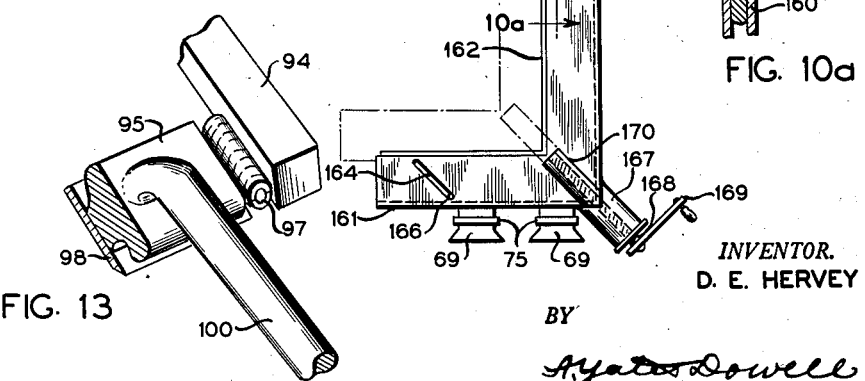
INVENTOR.
D. E. HERVEY
BY
ATTORNEY March 2, 1954     D. E. HERVEY     2,670,772
VENEER CUTTING LATHE AND LOG CENTERING MEANS
Filed Aug. 21, 1946     5 Sheets-Sheet 5

INVENTOR.
D. E. HERVEY
BY
A. Yates Dowell
ATTORNEY

UNITED STATES PATENT OFFICE 2,670,772

VENEER CUTTING LATHE AND LOG CENTERING MEANS

David E. Hervey, Old Fort, N. C., assignor to Hervey Foundation, Incorporated, a corporation of Maryland Application August 21, 1946, Serial No. 691,919

8 Claims. (Cl. 144—209)

This invention relates to the manufacture of wood veneer and particularly to an improved method of and improved apparatus for handling the veneer material from the rough logs to the finished veneer sheets.

According to present practice the lathe centers of the logs from which the veneer is to be cut are located by rough manual measurement or by estimation on the part of the lathe operator. The first method is time consuming and materially reduces the capacity of the veneer lathe and both methods are extremely wasteful of wood since any eccentricity of the major cylinder of a log produces a large number of small pieces of veneer having irregular edges. Such small pieces must be either discarded or heavily trimmed in order to salvage a relatively small portion. Such waste from improper centering of the logs in the lathe may run as high as twenty per cent or more of usable wood and the loss of time may reduce the production of the lathe more than ten per cent below its optimum capacity.

Barking of the logs is also a laborious and time consuming operation at present. As the logs are moved from the woods to the mill they are dragged and piled on the ground with the result that the bark accumulates a quantity of grit and stone particles such that the veneer cutting blade cannot be used to remove the bark as the edge of this blade must be maintained at razor-like sharpness. It is therefore the present practice to remove the bark with hand tools in a separate operation.

Difficulty is also experienced under the present practice in stacking and clipping the veneer sheets produced by the veneer cutting lathe. In most veneer making apparatus a single conveyor leads from the lathe toward a clipping machine. This conveyor either handles one sheet at a time or individual sheets are hand stacked on it. From the conveyor the single or hand stacked sheets are presented to the clipper. This operation is so time consuming that it is necessary to frequently stop the lathe in order to allow the clipperman time to reduce the stock of veneer sheets before the clipper. The pressure on the clipperman to try to keep up with the lathe also results in wastage of a large amount of usable veneer and in poor matching of the smaller pieces of veneer sheet. The present method also fails to provide for any segregation of the veneer according to quality of the wood or thickness of the veneer, or according to species when mixed logs are supplied to the lathe.

As exemplified above, the handling of the material in a veneer mill is at present unduly wasteful of time, labor and material. A great deal of attention has been given to this matter and important improvements have been made in specific items of equipment, such as the lathes and clippers, conveyors and storage racks. Little has been heretofore accomplished, however, in facilitating the handling of the material in the veneer manufacturing process and in reducing wastage of time and material.

It is therefore an object of the present invention to provide improved veneer manufacturing apparatus effective to substantially automatically center the logs in the veneer cutting lathe on the centers of the respective major cylinders of the logs, mechanically remove the bark from the centered logs without dulling the veneer cutting blade, and prepare logs for cutting veneer by cutting off protrusions of wood, and stack the veneer sheets in separate piles according to a desired segregation schedule.

Another object resides in the provision of an improved veneer manufacturing method effective to reduce loss of time and waste of material in converting logs into properly trimmed veneer sheets.

Figure 14:
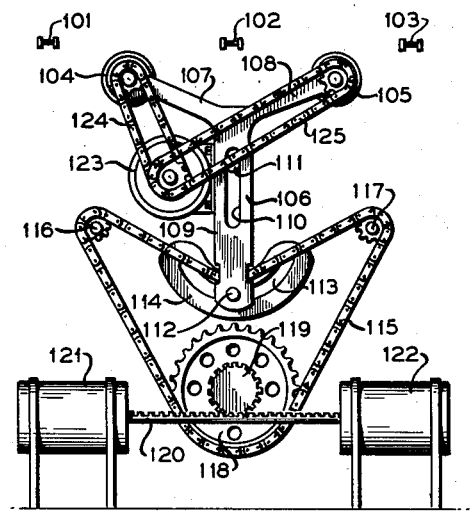
Figure 15:
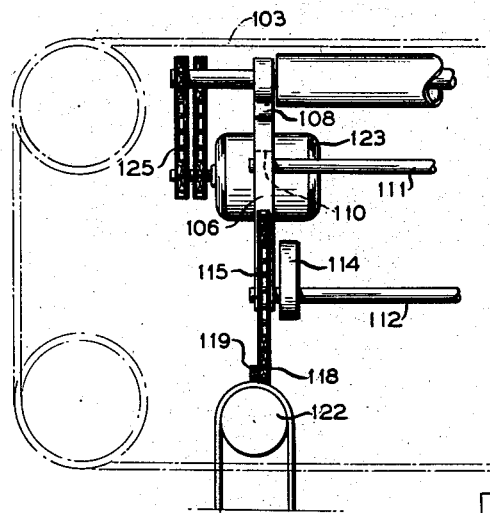
Figure 16:
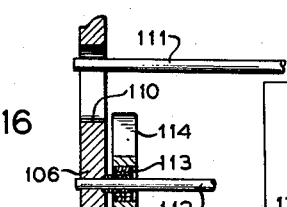
Figure 18:
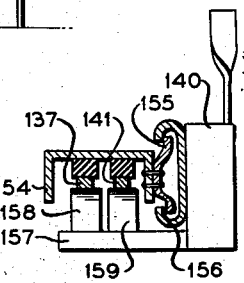
Figure 17:
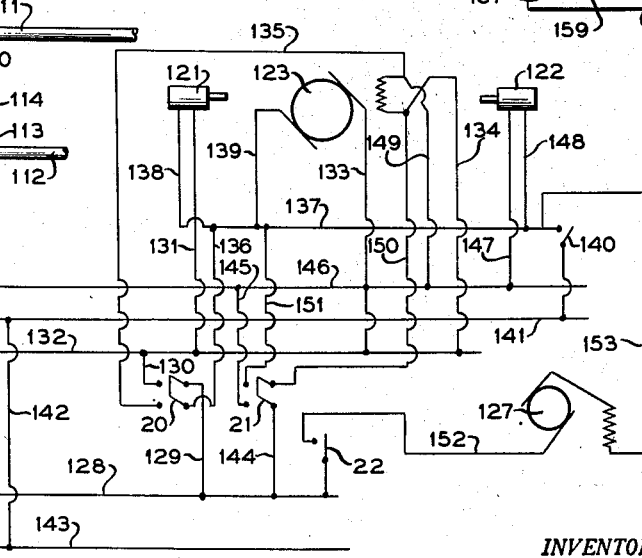

Other objects and advantages will become apparent from a consideration of the following description in conjunction with the accompanying drawing, in which:

Fig. 1 is a diagrammatic plan view of veneer manufacturing apparatus illustrative of the invention;

Fig. 2, a top plan view of a veneer cutting lathe showing the application thereto of an improved log centering device;

Fig. 3, an elevational view of a fragmentary portion of one end of the lathe, the lathe bed being shown in section;

Fig. 4, a top plan view on an enlarged scale of a fragmentary portion of the lathe shown in Fig. 2 showing the means of supporting and operating the log centering mechanism;

Fig. 5, a detailed view of a hinge mounting for a log supporting angle bracket;

Fig. 6, an elevational view of a log supporting angle bracket, a portion being broken away and shown in section to better illustrate the construction thereof;

Fig. 7, a top plan view of the angle bracket shown in Fig. 6;

Fig. 8, an elevational view of an angle bracket showing an insert adapted to be applied thereto to compensate the bracket for tapered logs;

Fig. 9, a view similar to Fig. 8 with the insert operatively associated with the angle bracket;

Fig. 9a, an elevational view of a modified form of angle bracket;

Fig. 10, a sectional view on the line 10—10 of Fig. 9;

Fig. 10a, a sectional view on the line 10a—10a of Fig. 9a;

Fig. 11, a somewhat diagrammatic elevational view of a veneer cutting lathe and associated log debarking mechanism;

Fig. 12, a transverse sectional view on the line 12—12 of Fig. 11;

Fig. 13, a detailed view showing the construction at one end of the log debarking knife shown in Fig. 11;

Fig. 14, an end view of a veneer moving conveyor showing mechanism for discharging veneer pieces at the opposite sides of the conveyor;

Fig. 15, a side elevational view of the end portion of the conveyor shown in Fig. 14;

Fig. 16, a detail view showing the construction of the side discharging means for the veneer pieces;

Fig. 17, a diagrammatic wiring diagram for the mechanism which discharges the veneer pieces from the conveyor, and Fig. 18, a somewhat diagrammatic cross sectional view of a support for an adjustable control switch for the conveyor discharge means.

With continued reference to the drawings and particularly to Fig. 1, logs 9, cut to proper length, are transferred from a storage area 10 to the veneer cutting lathe generally indicated at 11. The logs are centered in the lathe so that the axis of the major right cylinder of each log is substantially coincident with the axis of rotation of the lathe spindles. The lathe spindles are then engaged with the log and while the log is turned in the lathe the debarking mechanism, generally indicated at 12, is brought into contact with the surface of the log and substantially all of the bark is removed from the log. A veneer cutting knife is then brought into contact with the log and a veneer sheet, as indicated at 13, is peeled from the log and fed onto the conveyor, generally indicated at 14. Veneer pieces are discharged from the conveyor onto suitable surfaces such as the platforms of carts positioned adjacent the conveyor. In the arrangement illustrated in Fig. 1, five discharge or unloading carts or stations are provided, as indicated at 15, 16, 17, 18 and 19. In the remainder of the drawings, however, only three such discharge stations are provided in order to simplify the drawings and description, it being understood that additional stations may be added if desired.

In Fig. 1, three control switches 20, 21 and 22 are shown for selectively discharging the veneer pieces to three stations disposed one at each side of the conveyor and one at the outer end of the conveyor. These switches are located so that they are convenient to the lathe operator, who usually stands near one end of the lathe at the discharge side thereof. As the veneer sheet leaves the lathe the operator observes its condition and breaks out imperfections such as knots and decayed places in the wood and also breaks the sheet to provide pieces of convenient length for handling. He also notes the type of veneer, such as the species of wood from which it is cut, and the thickness and operates the switches 20, 21 and 22 to stack the pieces of veneer in separate stacks according to some predetermined schedule based on quality, species, thickness, or other factors which it may be desired to use as a basis for segregation of the veneer pieces, for example, he may desire to stack veneer pieces exceeding a certain minimum length on the side stacks and stack the shorter pieces in a stack at the outer end of the conveyor.

The carts provided for receiving the veneer pieces from the conveyor may conveniently have smooth, flat platforms provided along one side and at the ends with upstanding stakes 23 to hold the veneer pieces in even stacks, the side adjacent the conveyor being left unobstructed, and a pair of wheels 24 located under the center portion of the platform so that the carts may be moved to and away from the conveyor when desired. Single end wheels (not shown) may also be provided to support the cart platforms in a substantially level condition.

The veneer cutting lathe, as particularly illustrated in Figs. 2, 3, and 4, has a bed 25 mounted on a suitable base or foundation 26 and a pair of end housings 27 and 28 supported on the end portions of the bed 25. The end housing 27 carries a rotatable log engaging spindle 29 and the end housing 28 carries a similar spindle 30, the spindles being mounted upon suitable drive shafts journalled in the end housings. A lathe driving motor is provided outside of the lathe and is coupled to the spindle shafts through suitable clutch means, gear trains and connecting drive shafts in a manner known to the art, hence not illustrated.

A screw shaft 31 is supported on the end housing 27 and preferably has its axis in a substantially horizontal plane passing through the axis of rotation of the spindles 29 and 30 and in a substantially vertical plane perpendicular to the spindle axis. A similar screw shaft 32 is carried by the end housing 28. The screw shafts are driven from the lathe mechanism by suitable drive means including the bevel gears 33 and 34 on the ends of the respective screw shafts.

An elongated internally threaded sleeve or nut 35 is threaded onto the shaft 31 and a similar sleeve or nut 36 is threaded onto the shaft 32. A pressure bar 37 extends between the screw shafts 31 and 32 and is secured at its ends to the nuts 35 and 36 so that the pressure bar is moved toward or away from the spindle axis of the lathe when the screw shafts are driven. A veneer cutting knife 38 is carried by the pressure bar which also carries or includes a rounded nose portion 39 which bears against the surface of the log immediately above the knife to control the thickness of the veneer sheet removed from the log by the knife. The distance between the edge of the knife 38 and the pressure nose 39 can be adjusted to control the thickness of the veneer sheet and the ratio between the speed of the knife feed into the log and the speed of rotation of the log can also be adjusted to maintain a substantially uniform pressure of the pressure nose 39 on the surface of the log. The rotational speed of the log may be controlled by a lever 40 and the knife feed may be controlled by a plurality of speed adjusting levers or buttons 41 located on top of the end housing 27 and controlling suitable gear trains within the end housings. This control is obtained in a conventional manner by a speed change type of transmission enclosed in housing 27 and therefore is not shown in detail to avoid unnecessary prolixity.

The pressure bar 37 may be manually tilted to remove the pressure bar nose 39 from the wood and the knife feed drive may also be manually discontinued when desired so that bark may be removed in a separate operation from a log turned in the lathe.

Screw shafts 42 and 43 are mounted at the opposite side of the spindle axis from the respective screw shafts 31 and 32 and have their axes in or parallel to vertical planes including the axes of the shafts 31 and 32. The shafts 42 and 43 are preferably inclined downwardly at an angle of approximately 45° to the horizontal and have their lower ends journalled in respective bearings 44 and 45 mounted on the lathe bed 25. At their upper ends the screw shafts 42 and 43 are rotatably supported by journal means connected to the respective spindle shaft bosses 46 and 47 and carry respective bevel gears 48 and 49. The gears 48 and 49 mesh respectively with idler gears 50 and 51 mounted on extensions provided on the spindle boss caps and these idler gears also mesh with bevel gears 52 and 53 secured respectively on the inner ends of the screw shafts 31 and 32. By this arrangement, the shafts 42 and 43 are rotated simultaneously with the knife feed shafts 31 and 32. Although the shafts 42 and 43 are somewhat longer than the shafts 31 and 32 and are inclined at an angle to the axes of the knife feed screw shafts, the thread pitch on the shafts 42 and 43 is such that internally screw threaded sleeves or nuts 54 and 55 mounted on these shafts move in synchronism with the nuts 35 and 36 on the shafts 31 and 32. The nuts 54 and 55 are provided with respective arms or extensions 56 and 57 having their outer ends connected to the end portions of a shaft 58. A carriage 59 extends across the lathe between screw shafts 42 and 43 and shaft 58 partially supports said carriage, being secured thereto by suitable means such as caps 61.

The carriage is secured at its forward edge to a second transverse shaft 62 the ends of which carry cam followers, such as ball bearings, received in the trackways of respective cam or guide members 63 and 64 secured to the inner sides of the end housings 27 and 28.

As illustrated in Fig. 3, the cam member 63 has a straight intermediate portion merging at its upper end into a downwardly curved upper end portion 65 and at its lower end into an upwardly curved lower end portion 66. The cam or track member 64 is not shown in detail in the drawing but is similar in shape and construction to the member 63, shown in Fig. 3.

The movement of nuts 35 and 36 and 54 and 55 is such that the leading edges of the pressure bar 37 and carriage 59 are maintained at equal distances from the axis of rotation of spindles 29 and 30.

With this arrangement, when rotation of the screw shafts 42 and 43 moves the nuts 54 and 55 upwardly, at a predetermined position the cam followers on the ends of shaft 62 enter the downwardly extending portions 65 of the tracks 63 and 64 and the forward or leading edge of the carriage 59 is tilted downwardly. On the other hand, when the nuts 54 and 55 approach the lower ends of the corresponding screw shafts the cam followers on shaft 62 enter the upwardly curved end portions 66 of the tracks and the rear or following edge of the carriage 59 is tilted downwardly relative to the leading edge. The purpose for thus tilting the carriage 59 will presently become apparent.

The upper surface of the carriage 59 is provided with a pair of parallel longitudinally extending grooves or guideways 67 and 68, preferably of T-shaped or dovetailed cross section. Two pairs of slide blocks 69 and 70 are slidably mounted in these guideways and carry respective angle brackets 71 and 72. These angle brackets, for example the angle bracket 71 illustrated in Figs. 8, 9, and 10, have two arms 73 and 74 disposed at right angles to each other, the arm 73 normally being substantially vertical and the arm 74 substantially horizontal. The lower or horizontal arm 74 is secured to the corresponding pair of slide blocks 69 by a pair of hinge joints 75, particularly illustrated in Fig. 5. These hinge joints are so constructed as to provide radial shoulders or stops 76 and 77 disposed at 90° to each other, the shoulder 76 being effective to maintain the corresponding angle bracket 71 in an upright position and the shoulder 77 being effective to support the angle bracket in a substantially horizontal position when it is folded over, as indicated in broken lines in Fig. 5.

In order to accommodate logs of a maximum desired diameter, it is necessary for the arms of the angle brackets to be sufficiently long to contact the surface of such a maximum diameter log at points spaced 90° apart on the circumference of the log. With arms of this maximum length, the lower or horizontal arms of the angle brackets might interfere with the lower edge of the veneer cutting knife or the knife holding bracket when the pressure bar 37 and carriage 59 are moved to their innermost positions relative to the axis of the lathe spindles. It is necessary that the carriage 59 move at all times in constant relationship to the movement of the pressure bar 37 so that these two elements will always cooperate in the log centering operation. However, by tilting the forward edge of the carriage 59 downwardly as the carriage passes the position at which it centers a log of minimum diameter in the lathe, the ends of the horizontal arms of the angle brackets are moved downwardly and backwardly during the last part of the carriage movement and hence will have no tendency to interfere with the veneer cutting knife or the knife bracket.

When the carriage is tilted in the opposite direction at the lower end of its travel the vertical arms 73 of the angle brackets are moved backwardly toward a horizontal position to facilitate the placing of logs in the angle brackets.

The centering of logs in the lathe is substantially automatic. With the carriage 59 in its lowermost position, a log is placed in the angle brackets 71 and 72 and the lathe put into operation. The corresponding screw shafts are then rotated moving the pressure bar 37 inwardly toward the lathe spindle axis and at the same time moving the carriage 59 with the angle brackets and the log supported thereby toward the spindle axis. The relative movement of the pressure bar and the carriage is such that when the pressure bar contacts the log the log will be centered relative to the spindle axis and the spindles may then be engaged in the log so that it may be turned by the lathe. The pressure bar and the carriage are then moved back from the log while the bark is being removed from the log and after the bark has been removed the rotation of the screw shafts is resumed moving the pressure plate and the carriage again toward the spindle axis of the lathe. Before rotation of the screw shafts is resumed the angle brackets may be folded down so that they will not touch the log as the carriage moves upwardly and inwardly along the shafts 42 and 43. The tilting of the carriage in the upper portion of its range of movement prevents the horizontal arms of the angle brackets from striking the lower edge of the veneer cutting knife or its supporting member. However, the angle brackets may be left erect to serve as steady rests during the veneer cutting operation.

During the debarking operation the centering brackets 71 and 72 are folded down along carriage 59 so that they will not interfere with this operation.

After the log has been placed in the angle brackets while in their backwardly tilting condition movement of the cam followers through the upwardly curved lower end portions of the tracks 62 and 63 tilts the angle brackets upwardly to their normal condition in which the arms 73, 74 are substantially vertical and horizontal.

As it is only occasionally that a log of maximum diameter is encountered, it may be found desirable to ordinarily use angle brackets having horizontal legs shorter than that necessary to support a maximum diameter log and to provide a detachable extension for each horizontal leg for use when such logs are encountered. Such a construction is illustrated in Fig. 6, wherein the horizontal arm 74a is provided at its outer end with an enlargement 78 having therein a well or recess 79 to receive a tongue 80 on an end of an arm extension 81. By applying the detachable extension 81, arm 74a may be lengthened when necessary to accommodate a log of a size which the arm without the extension will not fit.

A good many logs from which veneer is cut are tapered from one end to the other so that a pair of similar angle brackets operating at the same level would not accurately center both ends of the log. Since it is desirable to center the log on the centers of its maximum right cylinder in order to obtain the greatest amount of usable veneer, the present machine provides means by the use of which both ends of the log may be accurately centered. Such means may conveniently comprise an angle bracket extension, such as is illustrated in Figs. 8 and 9 and generally indicated at 82. In this case, the inner edges of the angle bracket arms 73 and 74 are provided with longitudinal grooves 83 and 84, the groove in the arm 73 preferably being of T- or dovetail-shaped cross section, as is particularly illustrated in the enlarged view shown in Fig. 7. The extension 82 has two arms 85 and 86 at right angles to each other and these arms are provided along their outer edges with integral tongues 87 and 88 respectively. The tongue 87 on the vertical arm 85 preferably has a T- or dovetailed cross sectional shape to fit the groove 83 in the arm 73 while the tongue 88 on the bottom of horizontal arm 86 is straight. By this means, the extension may be slid into place from the top of the vertical arm 73 of the angle bracket and will be firmly secured in operative position as illustrated in Fig. 9. Extensions of different width may be provided to accommodate the centering mechanism to logs of varying taper or the inserts may be made manually adjustable by screws or otherwise to afford more accurate adjustment for logs of different taper.

The mechanism for removing bark from the logs is particularly illustrated in Figs. 11, 12 and 13 and may comprise a pair of standards 90 and 91 disposed one at each end of the lathe somewhat beyond the lathe ends and to the side of the lathe on which the veneer cutting knife is located. A substantially horizontal bar 92 is supported at its ends on the upper ends of standards 90 and 91 and has its axis substantially parallel to the axis of the lathe spindles. A pair of arms 93 and 94 are supported on the bar 92, each arm having one end thereof journalled on the bar. At their opposite or free ends the arms 93 and 94 are connected to a knife bar 95 by suitable flexible or pivoted joints 96 and 97. A downwardly curved knife blade 98 is secured at its ends to the ends of the downwardly curved bar 95 and a pair of handles 99 and 100 extend outwardly from the ends of the knife bar. Spacers 95' between the bar and the knife blade reinforce this structure. With this arrangement, an operator may grasp the handles 99 and 100 and bring the edge of the blade 98 into contact with the surface of a log turned in the lathe. As the surface of a rough or unbarked log is usually irregular and curved in shape rather than cylindrical, a straight knife would not remove the bark without also removing a considerable part of the usable wood. The curved knife 98, however, can be manipulated by the handles 99 and 100 to contact the log along its irregular surface in a desired manner, the flexible or pivoted connections 96 and 97 permitting tilting of the knife to bring any desired portion of its curved surface into contact with the log. By this means, substantially all of the bark can be removed from the log without removing any material part of the wood beneath the bark. The pivoting shaft 92 permits the raising or lowering of the barking mechanism so that the knife may be maintained in contact with the surface of logs not circular in cross section.

As explained above, as the veneer sheet is cut from a log turned in the lathe 11, it is fed onto a conveyor which moves it away from the lathe. Such a conveyor may comprise a group of parallel endless flexible carriers, such as the chains 101, 102 and 103 (Fig. 1) mounted on sprockets carried by suitable supporting shafts in a manner well known to the art. The chains are preferably continuously driven by a suitable power unit and may extend to any desired distance from the lathe. A single group of carriers may be used if desired or successive groups, as illustrated in Fig. 1.

For discharging pieces of veneer at the sides of the conveyor, suitable rollers are provided extending lengthwise of the conveyor between parallel flexible carriers. If three carriers are used, as illustrated, two rollers, disposed one between each outside carrier and the center carrier, may be utilized to move veneer pieces to the sides of the conveyor but additional rollers may be added if desired. Only two rollers are shown and described in this disclosure in order to maintain the drawing and description as simple as possible and are indicated at 104 and 105 in Fig. 14 with the roller 104 disposed between carrier chains 101 and 102 and roller 105 disposed between chains 102 and 103. The rollers 104 and 105 are supported by end bearings in a suitable cradle having Y-shaped end pieces, as indicated at 106. See also Figs. 15 and 16. As the end pieces are similar in construction and arrangement, only one has been illustrated. This end piece has roller supporting arms 107 and 108 joined to a depending stem portion 109 having intermediate its length an elongated slot 110 through which extends the end of a fixed shaft 111 extending longitudinally of the cradle. At its lower end the stem 106 is provided with a pin 112 extending into a curved guideway 113 in a fixed cam member 114. A chain 115 has its ends connected to the lower portion of stem 106 and passes around sprockets 116, 117 and 118. The sprockets 116 and 117 are relatively small and are disposed one to each side of the stem 106 above the pin 112, while the sprocket 118 is relatively large and disposed directly below the pin 112. The sprocket 118 is provided with a gear 119 having teeth which mesh with teeth on a rack bar 120, the ends of which are received in a pair of solenoids 121 and 122. When one of the solenoids is energized, the rack bar will be moved in the corresponding direction and when the other is energized the rack bar will move in the opposite direction. Movement of the rack bar will rotate the sprockets 118, which through the intermediacy of the chain 115 will swing the lower end of stem 106. The shape of cam guideway 113 is such that when pin or cam follower 112 is moved along the guideway from its central position the entire cradle will be raised and at the same time will be tilted bringing one of the rollers a small distance above the corresponding flexible carrier members and the other roller a greater distance above the carrier members, depending upon the direction in which the stem is moved. This raising and tilting of the rollers positions them to discharge veneer pieces from the conveyor at a selected side of the conveyor. The rollers are driven by a reversible motor 123 which may conveniently be mounted on the stem 106 and connected to the rollers by suitable chains 124 and 125. The direction of rotation of the rollers will depend upon the selection of the side of the conveyor at which the veneer is to be discharged.

A speed or pick up roller 126 (Fig. 1) is disposed at the end of the conveyor and driven by a suitable motor 127 so that the veneer pieces may be discharged directly from the end of the conveyor when desired.

The wiring circuit for controlling the discharge of veneer pieces is diagrammatically illustrated in Fig. 17 in which the switch 20 controls the reversible motor 123 and the solenoid 121 while the switch 21 controls the reversible motor and the solenoid 122. When the switch 20 is closed, a circuit will be made from the line wire 128, through lead 129, switch 20, leads 130 and 131, and with wire 132 to one side of the solenoid 121 and simultaneously through wire 132 and lead 133 to one side of the armature of motor 123. The switch 20 is a double pole, single throw switch and also acts to complete a circuit to one side of the field of the reversible motor from wire 132, which is energized by the solenoid side of the switch through lead 134 to one side of the motor field and from the other side of the motor field through lead 135, the secondary switch poles and lead 136 to wire 137. The opposite side of the solenoid 121 and the opposite side of the motor armature are connected to wire 137 by leads 138 and 139 respectively. Wire 137 leads through trigger switch 140 and leads 141 and 142 to the opposite line wire 143. Thus when the trigger switch 140 is closed, the electric circuit will be completed through the solenoid 121, through the armature of the reversible motor 123 and through the motor field in a given direction to provide the desired direction of rotation to the motor. At the same time, connections through the motor field in the opposite direction will be interrupted by the open switch 21. Thus, closing of switch 20 will cause discharge of veneer pieces to a predetermined side of the conveyor. When it is desired to discharge the pieces to the other side of the conveyor, switch 21 is closed, which completes a circuit to the solenoid 122 through lead 144 from line wire 128, lead 145, wire 146, and lead 147, and from the armature through lead 148 and trigger switch 140 back to the opposite line wire 143, thus energizing the solenoid. At the same time, the armature of the reversible motor is energized through a circuit including lead 145, wire 146, lead 138, lead 139, wire 137 and trigger switch 140. The motor field will be excited in the opposite direction by a circuit including leads 144 and 145, wire 146, lead 149, lead 150, the secondary poles of switch 21 and lead 151 to wire 137, trigger switch 140 to line wire 143. Thus, when solenoid 122 is energized, the motor will rotate in the opposite direction from its direction of rotation when solenoid 121 is energized.

When it is desired to discharge the veneer pieces from the end of the conveyor, switch 22 is closed, which connects line wire 128 through the switch and lead 152 with motor 127 and from the motor the circuit is completed through lead 153 to trigger switch 140 and from this switch back to line wire 143 in the manner indicated above.

The trigger switch 140 is located at a position reached by the outer ends of the veneer pieces at which it is desired to discharge the pieces from the conveyor and is preferably adjustable along the length of the conveyor so that the veneer pieces may be discharged at any desired location within reasonable limits. To render the position of the trigger switch adjustable, a channel member 154 (Fig. 18) is provided extending lengthwise of the conveyor and suitably supported. This channel member carries two spaced flat conductors 137 and 141 secured to the channel member but suitably insulated therefrom. At one side of the channel member there is provided a track 155 which slidably supports a bracket 156 to which the micro switch or trigger switch 140 is attached. An arm 157 extending from the switch 140 passes beneath the channel member and carries a pair of contact springs 158 and 159 which connect the conductors 137 and 141 with the switch mechanism. By this means, the location of the switch can be varied along the length of the conveyor as may be desired.

Figs. 9a and 10a illustrate a modified angle bracket having provision for fine adjustment of the log contacting faces of the two brackets, disposed one adjacent each end of the log, so that spacial adjustment may be made for the small ends of tapered logs since with the previously described centering device only the large ends would be centered.

The modified bracket comprises a supporting portion 160 to the lower or horizontal leg 161 of which are attached the hinges 75 and slide blocks 69 for mounting the bracket on the carriage 58. This supporting portion 160 may conveniently have a U-shaped cross sectional form with a deep groove receiving the vertical and horizontal legs of an adjustable bracket part 162. Slots as indicated at 163 and 164 in the side walls of the part 160 receive corresponding pins 165 and 166 which extend through the adjustable part 162 to guide the adjustable part relative to the supporting part. These slots are located at an angle to the edges of the vertical and horizontal arms of the bracket, an angle of approximately 45° having been found satisfactory. At its corner the supporting part 160 may be provided with a bushing 167 through which extends a screw shaft 168 having on its outer end a crank 169. This screw shaft is threaded through an internally threaded bore 170 in the member 162 at the corner where the vertical and horizontal legs of the member are joined. The bushing 167 in shaft 168 is set at an angle of approximately 45° to the vertical and horizontal legs of the two brackets so that rotation of the screw shaft will move the part 162 relative to the part 160 in a manner such that the horizontal and vertical legs of the member 162 will move parallel to the corresponding vertical and horizontal legs of the member 160. This screw arrangement permits a fine adjustment of the member 162 relative to the member 160 so that the brackets may be accurately adjusted to the taper of various logs to be centered in the lathe.

It will be obvious to those skilled in the art that various changes may be made in the above described embodiment of the invention without departing from the spirit and scope thereof and therefore the invention is not limited by that which is shown in the drawings and described in the specification but only as indicated in the appended claims.

What is claimed is:

1. In veneer manufacturing apparatus including a veneer cutting lathe, log centering means for said lathe comprising spaced supports each having legs perpendicular to each other and angle brackets slidably mounted on said supports for movement along lines bisecting the right angles between respective bracket legs, a pressure bar mounted for movement relative to the rotational axis of said lathe, a member supporting said spaced supports and mounted for movement relative to the axis of said legs, and means operatively connected with said pressure bar and said member to move them simultaneously toward and away from said axis.

2. In combination with a wood veneer cutting lathe having a pair of oppositely disposed log turning spindles, a pressure bar mounted for movement in a substantially horizontal direction toward and away from the axis of said spindles, a veneer cutting knife carried by said pressure bar, and screw shafts having nuts thereon for engaging said pressure bar and moving said pressure bar and said knife; log centering means for said lathe comprising screw shafts extending downwardly from said spindle axis at an angle of approximately 45° to the axis of said pressure bar moving screw shafts; a nut on each of said downwardly extending screw shafts; a carriage pivotally supported at its ends on said nuts; curved trackways disposed one adjacent each end of said carriage; cam followers on said carriage engaged in said trackways to tilt said carriage forwardly and downwardly at the upper end of said trackways and upwardly and rearwardly at the lower ends of said trackways; and a pair of angle brackets carried by said carriage for receiving and supporting logs while said logs are being centered in said lathe, means for simultaneously rotating said pressure bar moving screw shafts and said carriage supporting screw shafts, said screw shafts having relative thread pitch such as to move said pressure bar and said carriage toward and away from said spindle axis so that the distance from the spindle axis to the pressure bar remains equal to the distance along lines extending from the spindle axis to the closest points of the vertical and horizontal legs of the angle brackets.

3. In combination with a wood veneer cutting lathe having a pair of oppositely disposed log turning spindles, a pressure bar mounted for movement toward and away from the axis of said spindles, a knife carried by said pressure bar and screw threaded means carried by said lathe and engaging said pressure bar; screw threaded means at the opposite side of said lathe from said pressure bar inclined downwardly at an angle of approximately 45° to the vertical; a carriage supported by said screw threaded means for movement toward and away from said spindle axis; guide means extending lengthwise of said carriage; blocks slidable in said guide means; a pair of parallel angle brackets supported by said blocks for movement lengthwise of said carriage; and hinge means having their axes extending transversely of said carriage securing said angle brackets to said blocks.

4. Log centering means for a veneer cutting lathe comprising a carriage substantially parallel to the axis of rotation of said lathe and mounted for movement toward and away from said axis; a pair of angle brackets carried by said carriage and mounted for movement lengthwise of the carriage; and insets for said angle brackets detachably mountable on either angle bracket to compensate the angle brackets for difference in the diameters of the two ends of a tapered log.

5. In combination with a wood veneer cutting lathe having a pair of oppositely disposed log turning spindles, a pressure bar movable in a substantially horizontal direction toward and away from the axis of said spindles, a veneer cutting knife carried by said pressure bar, and screw shafts having nuts thereon for engaging said pressure bar and carried by said lathe for moving said pressure bar and said knife; log centering means for said lathe comprising screw shafts extending downwardly from said spindle axis at an angle of approximately 45° to the axis of said pressure bar moving screw shafts; a nut on each of said downwardly extending screw shafts; a carriage pivotally supported at its ends on said nuts; curved trackways disposed one adjacent each end of said carriage; followers on said carriage engaged in said trackways to tilt said carriage forwardly and downwardly at the upper end of said trackways and upwardly and rearwardly at the lower ends of said trackways; and a pair of angle brackets carried by said carriage for receiving and supporting logs while said logs are being centered in said lathe, means for simultaneously rotating said pressure bar moving screw shafts and said carriage supporting screw shafts to move said pressure bar and said carriage toward and away from said spindle axis; and insets for said angle brackets detachably mountable on either angle bracket to compensate the angle brackets for difference in the diameters of the two ends of a tapered log.

6. Log centering means for a veneer cutting lathe comprising a carriage movable toward and away from the axis of rotation of said lathe; a pair of angle brackets carried by said carriage for movement lengthwise of the carriage; and adjustable insets for said angle brackets to compensate the angle brackets for difference in diameter of the two ends of a tapered log.

7. Log centering means for a veneer cutting lathe comprising a carriage movable toward and away from the axis of rotation of said lathe; angle brackets carried by said carriage each comprising a supporting part mounted on said carriage, a log contacting part adjustably carried by said supporting part, and means operatively connected between said parts for adjusting said log contacting part relative to said supporting part toward and away from said axis.

8. A centering device for a lathe having a horizontal axis comprising a pair of screw shafts extending downwardly and rearwardly from the lathe axis, nuts mounted on said screw shafts, means to rotate the screw shafts for moving the nuts toward and away from the lathe axis, a carriage pivotally mounted on said nuts, angle members having the legs thereof diverging toward said axis mounted on said carriage, tracks having a central portion arranged in parallel relation to said screw shafts and having a forward portion adjacent the lathe axis extending downwardly from the lathe axis and the central portion and having a lower portion extending rearwardly, means on the carriage spaced from the pivotal mounting thereof engaging said track so that said carriage will move toward and away from the axis of the lathe when said means is in engagement with the central portion of the track and tilting said carriage downwardly when said means is in said forward end portion of the track and tilting said carriage in the opposite direction when said means is in the rearward end portion of the track whereby a log may be received on the carriage and the angle members be moved out of the way during part of a turning operation.

DAVID E. HERVEY.

References Cited in the file of this patent

UNITED STATES PATENTS

| Number | Name | Date |
| --- | --- | --- |
| 412,553 | Smith | Oct. 8, 1889 |
| 832,519 | Wood | Oct. 2, 1906 |
| 843,519 | Crane | Feb. 5, 1907 |
| 887,075 | Dittbenner | May 12, 1908 |
| 1,473,545 | Collier | Nov. 6, 1923 |
| 1,523,786 | Merritt | Jan. 20, 1925 |
| 1,646,115 | Sjostrom | Oct. 18, 1927 |
| 1,670,657 | Friede | May 22, 1928 |
| 1,686,640 | Pierce, Jr. | Oct. 9, 1928 |
| 1,841,544 | Merritt | Jan. 19, 1932 |
| 1,841,854 | Stanley | Jan. 19, 1932 |
| 1,855,577 | Kirkwood | Apr. 26, 1932 |
| 2,328,545 | Burkowsky | Sept. 7, 1943 |
| 2,352,885 | Burkowsky | July 4, 1944 |